US009875087B2

United States Patent
Scholz et al.

(10) Patent No.: US 9,875,087 B2
(45) Date of Patent: Jan. 23, 2018

(54) DECLARATIVE PROGRAM ENGINE FOR LARGE-SCALE PROGRAM ANALYSIS

(71) Applicant: Oracle International Corporation, Redwood Shores, CA (US)

(72) Inventors: Bernhard F. Scholz, Sydney (AU); Till Westmann, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 152 days.

(21) Appl. No.: 14/714,208

(22) Filed: May 15, 2015

(65) Prior Publication Data

US 2016/0299748 A1    Oct. 13, 2016

Related U.S. Application Data

(60) Provisional application No. 62/146,218, filed on Apr. 10, 2015.

(51) Int. Cl.
*G06F 9/44* (2006.01)
*G06F 9/45* (2006.01)

(52) U.S. Cl.
CPC .............. *G06F 8/427* (2013.01); *G06F 8/436* (2013.01); *G06F 8/443* (2013.01)

(58) Field of Classification Search
CPC ... G06F 8/456; G06F 8/31; G06F 8/34; G06F 8/436; G06F 8/427; G06F 8/443
See application file for complete search history.

(56) References Cited

U.S. PATENT DOCUMENTS

| 4,686,623 | A | * | 8/1987 | Wallace | G06F 8/427 717/117 |
| 4,930,072 | A | * | 5/1990 | Agrawal | G06F 17/30513 |
| 4,931,928 | A | * | 6/1990 | Greenfeld | G06F 8/427 707/999.003 |
| 5,546,571 | A | * | 8/1996 | Shan | G06F 17/30961 |
| 5,603,028 | A | * | 2/1997 | Kitsuregawa | G06F 9/5083 718/105 |

(Continued)

OTHER PUBLICATIONS

Rakesh Agrawal et al., "Direct Transitive Closure Algorithms: Design and Performance Evaluation", [Online], ACM 1990, pp. 429-458, [Retrieved from Internet on Mar. 3, 2016], < http://delivery.acm.org/10.1145/90000/88888/p427-agrawal.pdf>.*

(Continued)

*Primary Examiner* — Ziaul A Chowdhury
(74) *Attorney, Agent, or Firm* — Osha Liang LLP (57) ABSTRACT

A method and system for staged compilation of a declarative program that includes receiving the declarative program, parsing and semantically checking the declarative program, translating the declarative program into a relational algebra machine (RAM) using a modified semi-naïve algorithm, performing a translation of the RAM into code of an imperative programming language to obtain a translated RAM, generating specialized extractor code in the imperative programming language, generating query application programming interface (API) code in the imperative programming language, and compiling the translated RAM, the specialized extractor code, and the query API code to obtain a program analysis module.

18 Claims, 7 Drawing Sheets

(56) References Cited

U.S. PATENT DOCUMENTS

| | | | | |
|---|---|---|---|---|
| 5,701,490 A * | 12/1997 | Safonov | ............... | G06F 8/427 717/143 |
| 5,875,334 A * | 2/1999 | Chow | ............... | G06F 8/427 717/139 |
| 6,865,567 B1 * | 3/2005 | Oommen | ............... | G06F 17/30463 |
| 8,881,122 B1 * | 11/2014 | Klimek | ............... | G06F 8/427 717/140 |
| 9,652,208 B2 * | 5/2017 | Li | ............... | G06F 8/443 |
| 2003/0115577 A1 * | 6/2003 | Garvey | ............... | G06F 8/427 717/136 |
| 2003/0188299 A1 * | 10/2003 | Broughton | ............... | G06F 8/427 717/141 |
| 2007/0028223 A1 * | 2/2007 | Meijer | ............... | G06F 8/427 717/140 |
| 2009/0199169 A1 * | 8/2009 | Lin | ............... | G06F 8/443 717/159 |
| 2010/0131936 A1 * | 5/2010 | Cheriton | ............... | G06F 9/4438 717/146 |
| 2010/0185599 A1 * | 7/2010 | Greenfield | ............... | G06F 17/30864 707/706 |
| 2010/0192129 A1 * | 7/2010 | Langworthy | ............... | G06F 8/437 717/126 |
| 2010/0299300 A1 * | 11/2010 | Wolf | ............... | G06N 5/02 706/46 |
| 2012/0023149 A1 * | 1/2012 | Kinsman | ............... | G06F 7/38 708/204 |
| 2014/0306964 A1 * | 10/2014 | Reddish | ............... | G06F 8/433 345/440 |
| 2014/0325476 A1 * | 10/2014 | Sayers | ............... | G06F 8/70 717/115 |

OTHER PUBLICATIONS

Chee Chin Low et al., "Efficient Access Methods in Deductive Object-Oriented Databases", [Online], 1991, pp. 68-84, [Retrived from Internet on Sep. 16, 2016], <http://download.springer.com/static/pdf/75/chp%253A10.1007%252F3-540-55015-1_4.pdf>.*

Diptikalyan Saha et al. "Incremental and Demanddriven PointsTo Analysis Using Logic Programming", [Online], 2005, pp. 1-12, [Retrieve from Internet on Sep. 18, 2017], <https://pdfs.semanticscholar.org/041d/abfd575628ee46b300d1c6ead8346b5c35c9.pdf>.*

Ganguly, S., et al., "A Framework for the Parallel Processing of Datalog Queries", Department of Computer Science, The University of Texas, 1990. (10 pages).

Whaley, J. et al., "Using Datalog with Binary Decision Diagrams for Program Analysis", Computer Science Department, Stanford University. Nov. 2, 2005 (22 pages).

Abiteboul, S. et al., "Foundations of Databases", Addison-Wesley Publishing Company, Inc. 1995. (702 pages).

Liu, Y. et al., "From Datalog Rules to Efficient Programs with Time and Space Guarantees", ACM Transactions on Programming Languages and Systems, vol. V, No. N, 20YY. Aug. 2009 (37 pages).

* cited by examiner

```
// transfer edge relation to path
// copy relation path to X_path
insert
    search edge do
        project (edge.u, edge.v) into path;
merge path into X_path;
// fixed-point loop
loop
// first unrolled loop iteration
delete Y_path;
insert
  search edge do
    search X_path where edge.v = X_path.v do
      project (edge.u, X_path.w) into Y_path notexists path;
exit counttuples(Y_path) = 0; // fixpoint reached?
merge Y_path into path;
// second unrolled loop iteration
delete X_path;
insert
  search edge do
    search Y_path where edge.v = Y_path.v do
      project (edge.u, Y_path.w) into X_path notexists path;
exit counttuples(X_path) = 0; // fixpoint reached?
merge X_path into path;
endloop
```

DECLARATIVE PROGRAM ENGINE FOR LARGE-SCALE PROGRAM ANALYSIS

CROSS-REFERENCE TO RELATED APPLICATIONS

This application claims benefit under 35 U.S.C. § 119(e) to U.S. Provisional Patent Application Ser. No. 62/146,218, filed on Apr. 10, 2015 and entitled, "A DATALOG ENGINE FOR LARGE-SCALE PROGRAM ANALYSIS." U.S. Provisional Patent Application Ser. No. 62/146,218 is incorporated herein by reference in its entirety.

BACKGROUND

Computer applications and/or libraries used with/by computer applications often include security vulnerabilities. Detection of such security vulnerabilities may occur via static program analysis. Static program analysis may be written in either an imperative programming language or in a declarative programming language. Writing a static program analysis in an imperative programming language may require writing large amounts of source code in an imperative programming language. Performing a static program analysis using a program expressed in a declarative programming language may become less viable when a program to be statically analyzed becomes very large (e.g., a program with many lines of code, many variables, many call-sites, many methods, etc.)

SUMMARY

In general, in one aspect, embodiments of the invention relate to a method for staged compilation of a declarative program that includes receiving the declarative program, parsing and semantically checking the declarative program, and translating the declarative program into a relational algebra machine (RAM) using a modified semi-naïve algorithm. The method also includes performing a translation of the RAM into code of an imperative programming language to obtain a translated RAM, generating specialized extractor code in the imperative programming language, generating query application programming interface (API) code in the imperative programming language, and compiling the translated RAM, the specialized extractor code, and the query API code to obtain a program analysis module.

In general, in one aspect, embodiments of the invention relate to a system for staged compilation of a declarative program that includes a declarative language compiler configured to receive a declarative program as input. The declarative language compiler includes a parse and semantic check module configured to parse and semantically check the declarative program; a graph generation module configured to compute a strongly connected component graph; a relational algebra machine (RAM) generation module configured to translate the declarative program into a relational algebra machine (RAM) using a modified semi-naïve algorithm; and a code generation module. The code generation module includes functionality to perform a translation of the RAM into code of an imperative programming language to obtain a translated RAM; generate specialized extractor code in the imperative programming language; generate query API code in the imperative programming language; and compile the translated RAM, the specialized extractor code, and the query API code to obtain a program analysis module.

In general, in one aspect, embodiments of the invention relate to a non-transitory computer readable medium comprising instructions that, when executed by a computer processor, perform a method for staged compilation of a declarative program that includes receiving the declarative program; parsing and semantically checking the declarative program; translating the declarative program into a relational algebra machine (RAM) using a modified semi-naïve algorithm; performing a translation of the RAM into code of an imperative programming language to obtain a translated RAM; generating specialized extractor code in the imperative programming language; generating query API code in the imperative programming language; and compiling the translated RAM, the specialized extractor code, and the query API code to obtain a program analysis module.

Other aspects of the invention will be apparent from the following description and the appended claims.

DETAILED DESCRIPTION

Specific embodiments of the invention will now be described in detail with reference to the accompanying figures. Like elements in the various figures may be denoted by like reference numerals and/or like names for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for creating a program analysis module to perform a static program analysis. Specifically, in one or more embodiments of the invention, a declarative program (i.e., a program expressed in a declarative programming language) for static program analysis is converted to an executable program analysis module. More specifically, in one or more embodiments of the invention, the declarative program is subjected to a staged compilation process in which the declarative program is first translated into a relational algebra machine (RAM), which is then translated into imperative language code. A specialized extractor and a query application program interface (API) may then be generated in code of the imperative language. The imperative language code that is generated based on the RAM, the specialized extractor, and the query API may then be compiled into an executable program analysis module. The program analysis module may then be used to perform static program analysis on an input program, and to provide results of the static program analysis. As an example, the program analysis module may include functionality to detect security vulnerabilities of a given program (e.g., a development kit)

Figure 1:
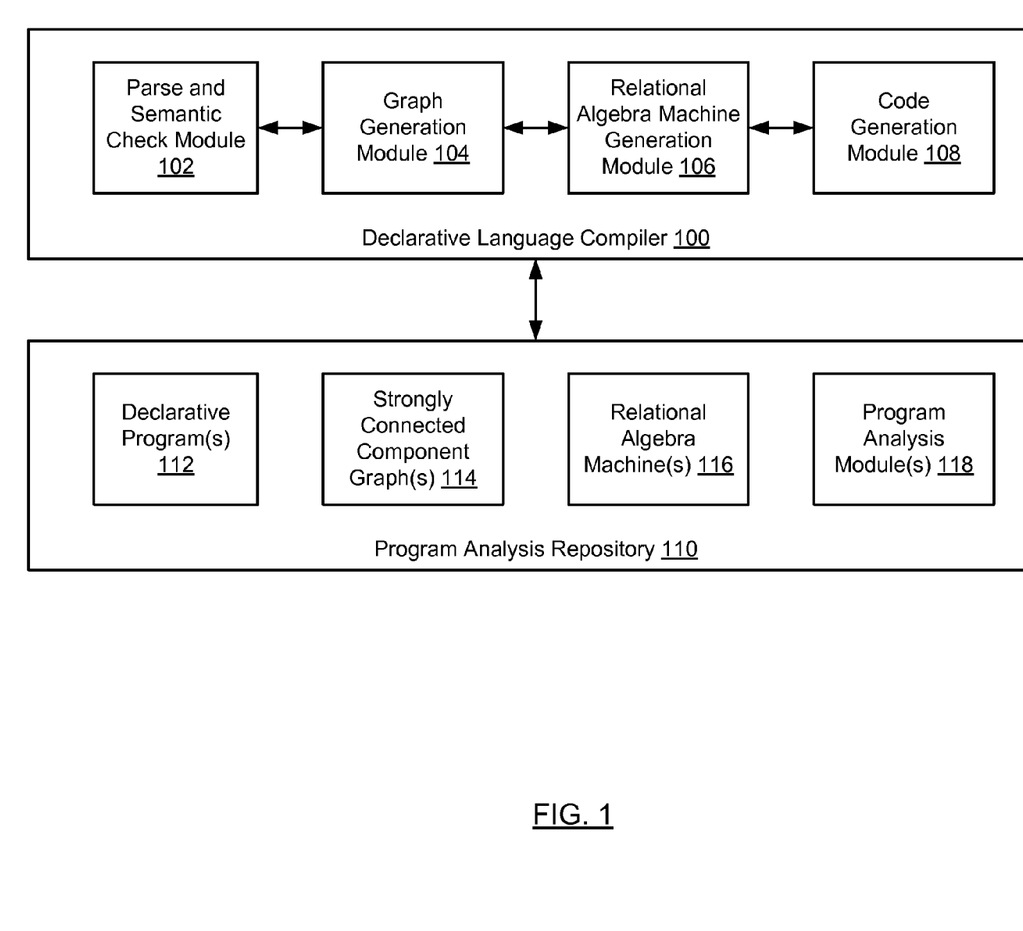
FIG. 1 shows a system in accordance with one or more embodiments of the invention.

FIG. 1 shows a system in accordance with one or more embodiments of the invention. As shown in FIG. 1, the system includes a declarative language compiler (100) and a program analysis repository (110). The declarative language compiler (100) may include a parse and semantic check module (102), a graph generation module (104), a relational algebra machine (RAM) generation module (106), and a code generation module (108). The program analysis module includes one or more declarative programs (112), one or more strongly connected component (SCC) graphs (114), one or more RAMs (116), and one or more compiled program analysis modules (118). Each of these components is described below.

In one or more embodiments of the invention, the declarative language compiler (100) is a compiler capable of producing an executable program analysis module from an input declarative program using a staged compilation process. In one or more embodiments of the invention, a compiler is any software, firmware, hardware, or any combination thereof, designed to transform source code written in a programming language into machine code that is capable of being executed by a computing device. The declarative language compiler (100) may include functionality to compile a declarative program (e.g., a program expressed in Datalog), provided as input, into an executable program analysis module (discussed further below and in the description of FIG. 2) using a staged compilation process (discussed further below in the description of FIG. 3). In one or more embodiments of the invention, the declarative language compiler (100) is operatively connected to a program analysis repository (110), which is described below.

In one or more embodiments of the invention, the declarative language compiler (100) and/or the program analysis module resulting from application of the declarative language compiler to an input declarative program may be executed on a computing device (not shown). In one or more embodiments of the invention, a computing device is any device and/or any set of devices (e.g., a distributed computing system) capable of electronically processing instructions, serially or in parallel, and that includes at least the minimum processing power, memory, input and output device(s), and/or network connectivity in order to contribute to the performance of at least some portion of the functions described in accordance with one or more embodiments of the invention. Examples of computing devices include, but are not limited to, one or more server machines (e.g., a blade-server in a blade-server chassis), virtual machines (VMs), desktop computers, mobile devices (e.g., laptop computer, smartphone, personal digital assistant, tablet computer, and/or any other mobile computing device), and/or any other type of computing device with the aforementioned minimum requirements.

In one or more embodiments of the invention, the declarative language compiler (100) includes a parse and semantic check module (102). In one or more embodiments of the invention, a parse and semantic check module (102) may be any software, hardware, firmware, and/or any combination thereof that includes functionality to, at least, parse and semantically check a declarative program. In one or more embodiments of the invention, parsing includes performing a syntactic analysis on source code of a programming language to create an internal representation of the source code for the declarative language compiler. A semantic check may be an analysis performed on source code related to the semantics expressed therein. For example, a semantic check may include an analysis of references (e.g., external references) made within the source code. Accordingly, the parse and semantic check module (102) may include functionality to perform syntactic and semantic analysis on a declarative program for the declarative language compiler.

In one or more embodiments of the invention, the declarative language compiler (100) includes a graph generation module (104). In one or more embodiments of the invention, a graph generation module (104) may be any software, hardware, firmware, and/or any combination thereof that includes functionality to generate a graph representing at least a portion of the declarative program. In one or more embodiments of the invention, the graph generation module (104) includes functionality to generate a strongly connected component (SCC) graph that includes components. In one or more embodiments of the invention, a component is at least a portion of a declarative program and includes one or more relations of the declarative program, and each relation may include one or more rules (i.e., clauses). SCC graphs (114) are discussed in greater detail below.

In one or more embodiments of the invention, the declarative language compiler (100) includes a RAM generation module (106). In one or more embodiments of the invention, the RAM generation module (106) may be any software, hardware, firmware, and/or any combination thereof that includes functionality to generate a RAM based on a declarative program. In one or more embodiments of the invention, the RAM generation module includes functionality to use a modified semi-naïve algorithm and a SCC graph to translate a declarative program into a RAM (described below), which generally is an abstract machine that expresses the declarative program as a set of relational algebra statements.

In one or more embodiments of the invention, the declarative language compiler (100) includes a code generation module (108). In one or more embodiments of the invention, the code generation module (108) may be any software, hardware, firmware, and/or any combination thereof that includes functionality to translate a RAM generated by the RAM generation module into code of an imperative programming language (e.g., C++). Additionally, the code generation module may include functionality to generate imperative programming language code for a specialized extractor and a query API, which are discussed further in the description of FIG. 2, below.

In one or more embodiments of the invention, the declarative language compiler is operatively connected to a program analysis repository (110). In one or more embodiments of the invention, the program analysis repository (110) is a data repository. In one or more embodiments of the invention, a data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments of the invention, the program analysis repository is a repository for storing data for use by and/or that is generated by the declarative language compiler.

In one or more embodiments of the invention, the program analysis repository (100) includes one or more declarative programs (112). A declarative program (112) is any computer program expressed in a declarative programming language. For example, a declarative program may be expressed in Datalog as a set of relations (i.e., facts) and rules (i.e., clauses) for performing a static program analysis. A relation may express facts as one or more tuples. A declarative program may express what a program should accomplish without expressing a sequence of instructions (i.e., a control flow) to accomplish the goal. Said another way, a declarative program (e.g., as opposed to imperative programming) may be a program in which the logic of a computation is expressed without describing its control flow. A declarative program language may seek to minimize side effects by describing what a program should accomplish rather than how to accomplish the program goal (e.g., performance of a static program analysis).

In one or more embodiments of the invention, the program analysis repository (110) is also configured to store one or more SCC graphs (114). As described above, a SCC graph (114), as used herein, is a graph that includes components of a declarative program. In one or more embodiments of the invention, a SCC graph is a precedence graph in which one or more regions include strongly connected components. A precedence graph may be a graph in which a partial order is imposed, dictating a topological order among the components of the graph. For example, a component A may include a relation that requires another relation of a component B. In such a case, component B will be placed ahead of component A in the ordering of a graph generated by the graph generation module.

In one or more embodiments of the invention, the program analysis repository (110) also includes one or more RAMs (116). In one or more embodiments of the invention, a RAM (116) is an abstract machine expressed in relational algebra statements translated from a declarative program. Relational algebra statements of a RAM may include relational algebra operations to compute results produced by clauses, relation management operations to keep track of previous, current and new knowledge in semi-naïve algorithm evaluation, imperative constructs including statement composition for sequencing the operations, loop construction with loop exit conditions to express fixed-points computations for recursively-defined relations, and parallel statements to indicate when statements may be executed in parallel.

Examples of relational algebra statements of a RAM include, but are not limited to, insert, merge, purge, order, loop/endloop, exit, and par/endpar. Insert may be a relational algebra statement that includes nested search operations followed by a projection and may be used, at least in part, for computing clauses of a declarative program. Merge may add tuples of a relation into another relation, while purge removes all tuples from a relation. Merge and purge may be used, for example, as relation management operations. Loop, endloop, and exit may represent control flow relational algebra statements. Loop may represent the beginning of a loop, endloop may represent the end of a loop, and exit may designate an exit condition which, if reached, causes exit from the loop without executing any more of the loop. Par and endpar may be relational algebra statements that indicate a given set of relational algebra statements are to be executed in parallel. Order may be a relational algebra statement that dictates the order in which a given set of statements are to be executed.

In one or more embodiments of the invention, the program analysis repository (110) also includes one or more compiled program analysis modules (118). In one or more embodiments of the invention, program analysis modules (118) are the output of the declarative language compiler and represent an executable program for performing static program analysis. An executable program may be a program that includes functionality to cause one or more computer processors to perform one or more operations (i.e., tasks) according to computer-readable instructions of the executable program. Program analysis modules are discussed further in the description of FIG. 2, below.

Figure 2:
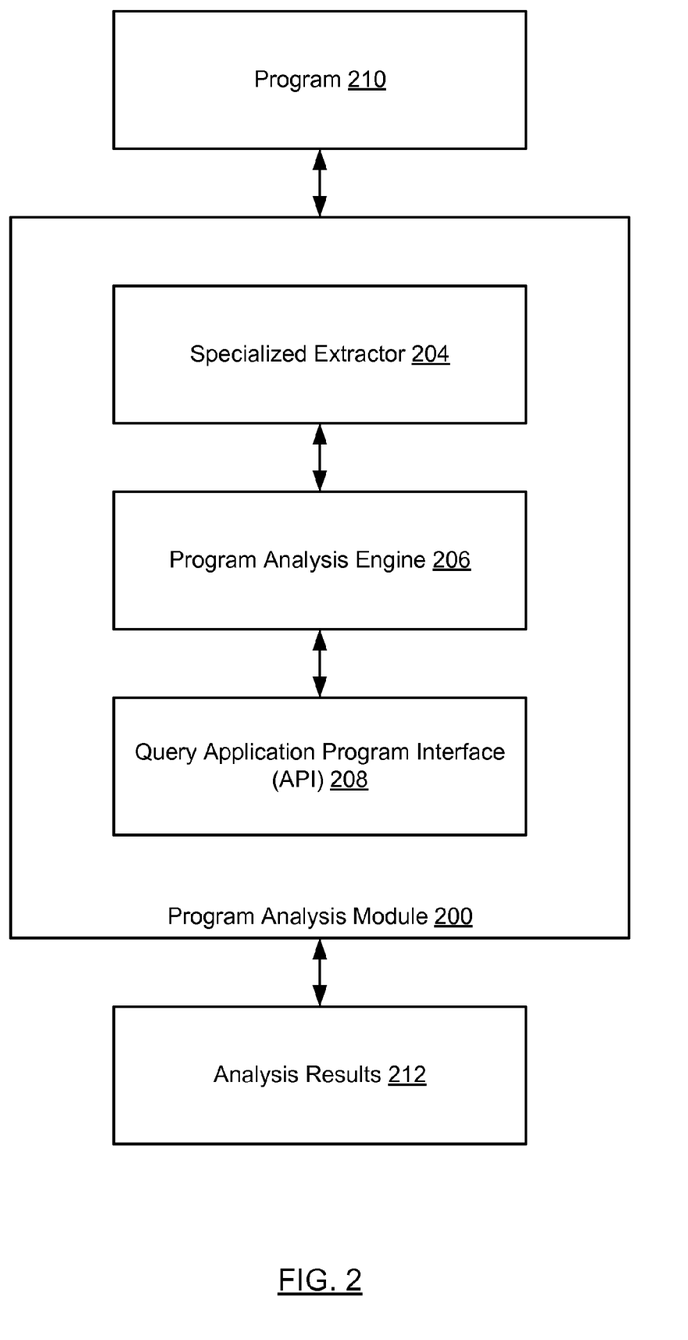
FIG. 2 shows a program analysis module in accordance with one or more embodiments of the invention.

FIG. 2 shows a program analysis module (200) in accordance with one or more embodiments of the invention. As shown in FIG. 2, the program analysis module (200) includes a specialized extractor (204), a program analysis engine (206), and a query API (208). The program analysis module may receive as input a program (210) to be analyzed, and, after analyzing the program, may include functionality to provide an analysis result (212). Each of the aforementioned components is described below.

In one or more embodiments of the invention, a program analysis module (200) is a monolithic executable program for performing static program analysis of a program (e.g., program (210)) provided as input. In one or more embodiments of the invention, the program analysis module is an executable program compiled from imperative programming language code. The program analysis module may be created by a declarative language compiler (e.g., declarative language compiler (100) of FIG. 1) using a staged compilation process. The program analysis module may be compiled from any imperative programming language code. For example, the program analysis module may be compiled from C++ code generated by the declarative language compiler.

In one or more embodiments of the invention, the program analysis module (200) includes a specialized extractor (204). An extractor may be at least a portion of a software program that translates an input program (210) to be analyzed into a set of input relations which may, for example, be used as input for the program analysis module. As shown in FIG. 2, the specialized extractor (204) is an extractor that has been generated in an imperative programming language and compiled as part of the program analysis module by a declarative language compiler. The specialized extractor (204) may be specialized to reduce the amount of data (i.e., relations) extracted from a given program to be analyzed. In one or more embodiments of the invention, the specialization of the specialized extractor (204) includes extracting only the relations of the program that are to be analyzed by the program analysis module. Further specialization may be related to extraction of subsets of relations (rather than entire relations) that are relevant to the program analysis.

In one or more embodiments of the invention, the program analysis module (200) includes a program analysis engine (206). In one or more embodiments of the invention, the program analysis engine (206) is at least a portion of a software program for performing a static program analysis on a program, whose relations have been extracted, at least in part, by the specialized extractor (204). In one or more embodiments of the invention, the program analysis engine includes functionality to perform a static analysis of a program to determine if there are any security vulnerabilities in the program. For example, the program may be a library (e.g., the Java Development Kit (JDK®)). In such an example, after relevant relations are extracted from the library by the specialized extractor, the program analysis engine may be configured to perform a static program analysis on the library without having to actually execute the any of the code of the library. In one or more embodiments of the invention, the output (i.e., analysis results) of the program analysis module includes output relations, which may include tuples.

In one or more embodiments of the invention, the program analysis module (200) includes a query API (208). In one or more embodiments of the invention, a query API is a programmatic interface for receiving queries related to the results of a static program analysis performed by the program analysis engine. In one or more embodiments of the invention, the query API includes an interface for each output relation generated by the program analysis engine. Each interface may, for example, include functionality to return iterators for the beginning and end of the output relation. In such an example, the iterators give read access to the tuples of the output relations. As shown in FIG. 2, the query API is an API that has been generated in an imperative programming language and compiled as part of the program analysis module by a declarative language compiler.

In one or more embodiments of the invention, the program analysis module (200) includes functionality to receive as input a program (210). In one or more embodiments of the invention, a program is any source code written in any programming language and/or combinations of programming languages. For example, the program may be a library written primarily in one programming language (e.g., Java®) but that includes mechanisms for calling certain operations that are written in another programming language.

Additionally, the program analysis module (200) includes functionality to provide analysis results (212). Analysis results may be any results of a static program analysis performed by the program analysis engine. Analysis results may be provided based on a query received from a user (not shown) of the program analysis module via the query API (208). The analysis results may be any portion of any output relation resulting from the static program analysis. As an example, the analysis results may provide a user insight into security vulnerabilities of the analyzed program.

While FIG. 1 and FIG. 2 show configurations of components, other configurations may be used without departing from the scope of the invention. For example, various components may be combined to create a single component. As another example, the functionality performed by a single component may be performed by two or more components. Accordingly, embodiments disclosed herein should not be considered limited to the specific arrangements of modules and elements shown in FIG. 1 and/or in FIG. 2.

Figure 3:
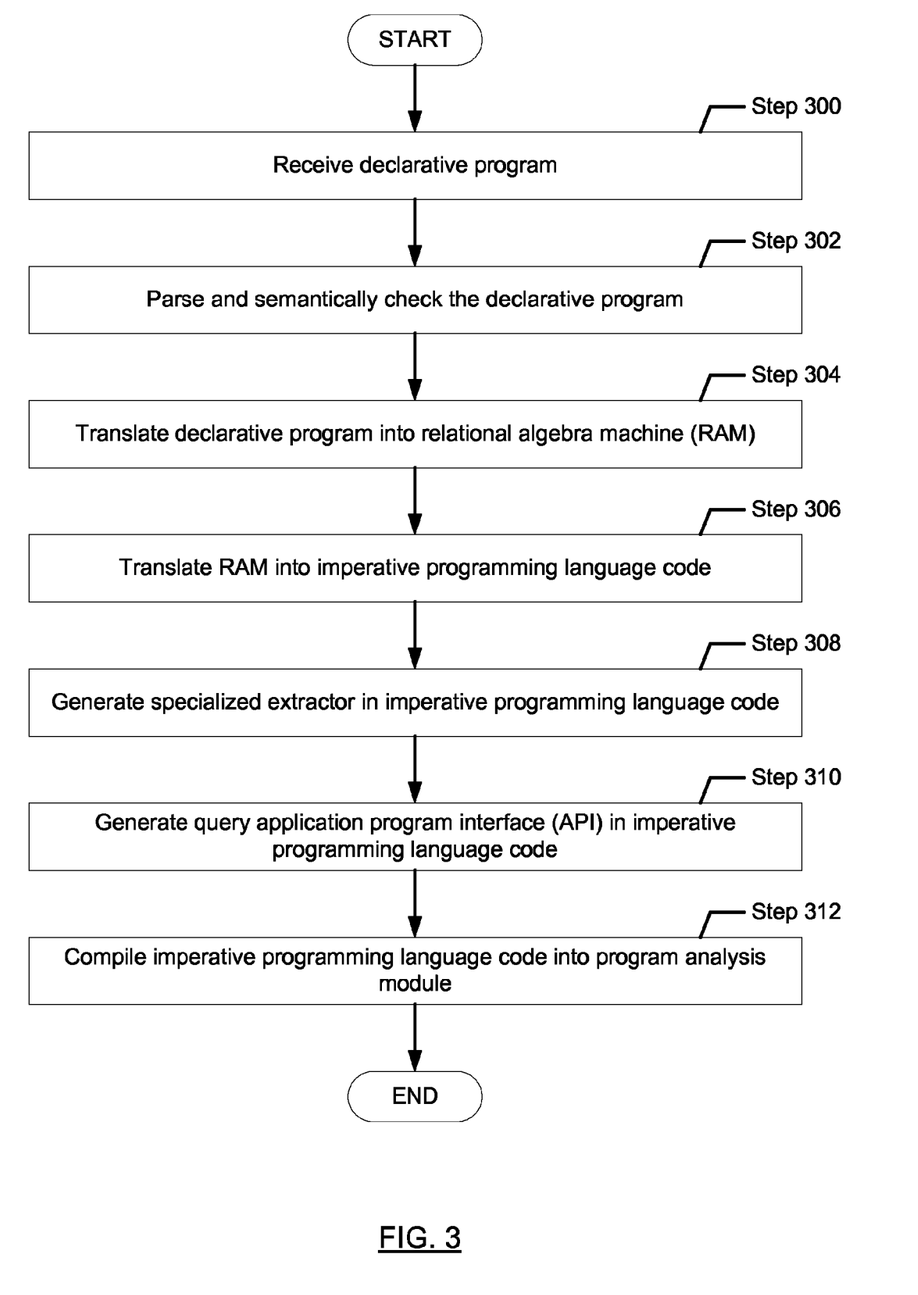
FIG. 3, FIG. 4A, and FIG. 4B show flowcharts in accordance with one or more embodiments of the invention.
Figure 4A:
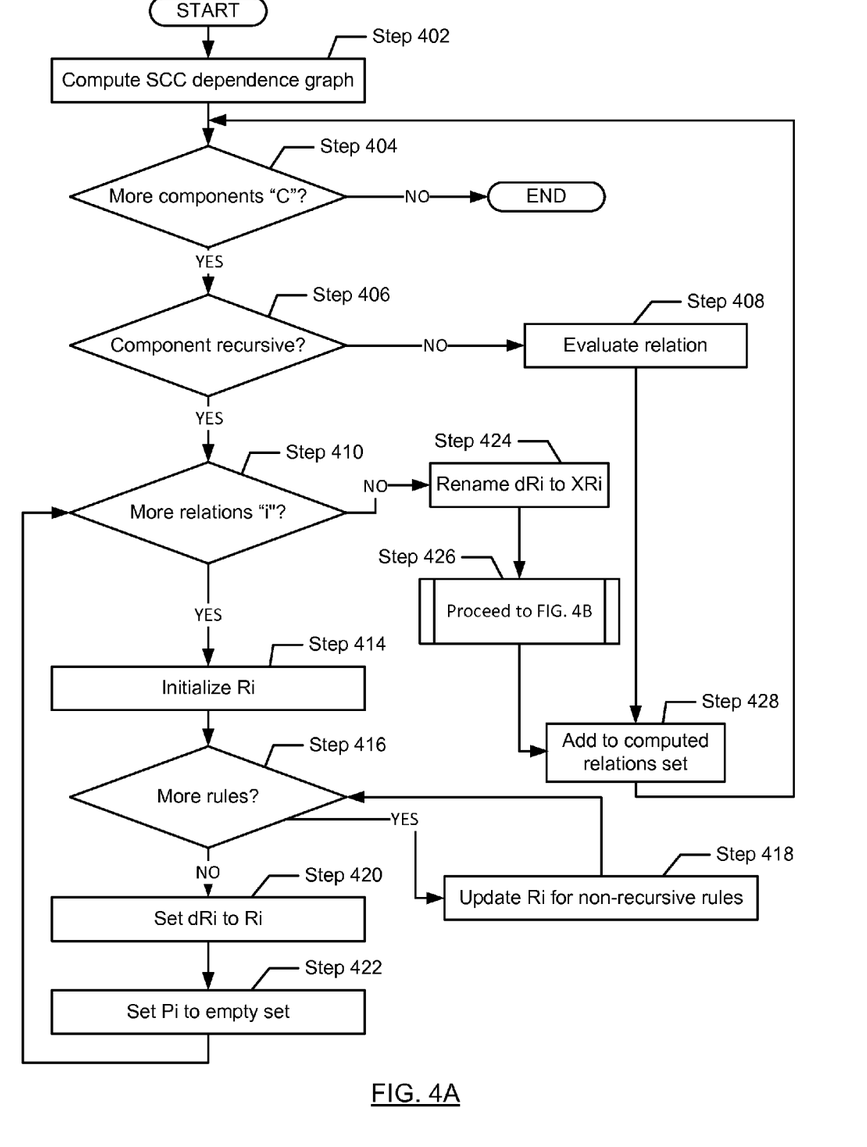
Figure 4B:
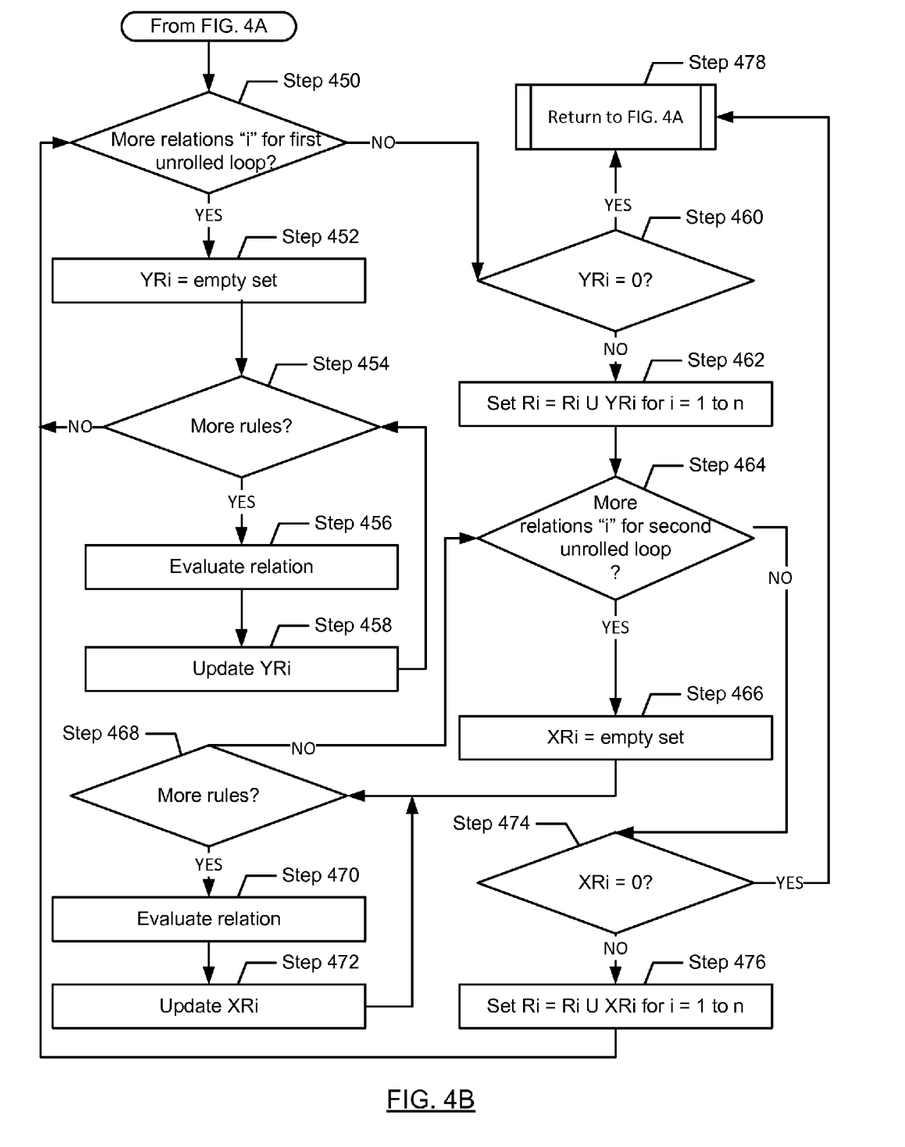

FIG. 3, FIG. 4A, and FIG. 4B show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention.

As another example, determination steps may be performed by performing a test, such as checking a data value to test whether the value is consistent with the tested condition in accordance with one or more embodiments of the invention.

FIG. 3 shows a flowchart describing a method for performing a staged compilation of a declarative program into an executable program analysis module. In Step 300, a declarative program is received. In one or more embodiments of the invention, the declarative program is received as input to a declarative language compiler. For example, a Datalog program that includes functionality to perform a static program analysis may be obtained from a program analysis repository and provided as input to the declarative language compiler. A declarative program may be provided to a declarative language compiler, for example, from a user who seeks to compile the declarative program into an executable program analysis module compiled from imperative language code into which the declarative program is translated as a part of a staged compilation process.

In Step 302, the declarative program received in Step 300 is parsed and semantically checked. In one or more embodiments of the invention, parsing and semantically checking a declarative program includes performing a syntactic and semantic analysis of the declarative program in order to generate an internal representation of the program for the declarative language compiler and to determine information about references made by the declarative program.

In Step 304, the parsed and semantically checked declarative program is translated into a RAM. In one or more embodiments of the invention, translating a declarative program into a RAM includes evaluating (i.e., computing) relations of the declarative program. In one or more embodiments of the invention, relations of a declarative program may either be recursive or non-recursive. A recursive relation may be a relation that is included in itself, immediately or intermediately, in the body of clauses of the relation.

In one or more embodiments of the invention, a declarative program is translated into a RAM, at least in part, using a modified semi-naïve algorithm to evaluate the relations. In particular, a semi-naïve algorithm may include, in part, an initialization loop, performing a set of initial operations, and a fixed-point loop for evaluating, at least in part, recursive relations of a declarative program. A semi-naïve algorithm may be an algorithm that divides recursively defined relations, per fixed point loop iteration, into subsets, including previous knowledge, current knowledge, delta knowledge, and new knowledge, which may be collectively referred to as a knowledge state block. Previous knowledge may be knowledge gained in the previous iteration of a fixed point loop. Delta knowledge may be new knowledge gained by the previous iteration of a fixed point loop. Current knowledge may be the combination of the previous knowledge and delta knowledge, and as such, represents the current knowledge of the presently executing iteration of a fixed point loop. New knowledge may be knowledge gained in a presently executing iteration of a fixed point loop. One having ordinary skill in the relevant art will recognize that knowledge related to a declarative program may grow monotonically during evaluation of a declarative program using a modified semi-naïve algorithm.

In one or more embodiments of the invention, a semi-naïve algorithm is modified by unrolling two iterations of a fixed point loop in order to reduce the bookkeeping overhead associated with evaluation of a declarative program using a semi-naïve algorithm. Reduction of bookkeeping overhead may be achieved, for example, by eliminating a copy operation between new knowledge and delta knowledge. Reduction of bookkeeping overhead may also be achieved by replacing previous knowledge with current knowledge when performing evaluation of a relation using an evaluation function, which may eliminate the need for a copy of previous knowledge into current knowledge. Additionally, the semi-naïve algorithm may expose high levels of parallelism for declarative programs, and thus execution speed may be improved by various parallelization techniques. For example, portions of the declarative program that are not dependent on one another may be evaluated in parallel, recursively defined relations may be executed in parallel, and/or rules of a given relation may be executed in parallel. Other parallelization opportunities may also exist.

Use of a modified semi-naïve algorithm to translate a declarative program into a RAM is discussed further in the descriptions of FIG. 4A and FIG. 4B, below.

In Step 306, the RAM into which the declarative program was translated into a RAM in Step 304 is translated into imperative programming language code. For example, the RAM may be translated into C++ code. In one or more embodiments of the invention, the translation of the RAM into C++ code is accomplished, at least in part, by implementing the statements, operations, conditions, and values of the RAM as abstract classes and classes, extended from the abstract classes, of an imperative programming language. Examples of abstract classes include, but are not limited to, Statement, Condition, Value, and Operation. As an example, from the abstract class Statement, the classes Insert, Merge, Delete, Sequence, Loop, and Exit may be extended. Additionally, the RAM may include auxiliary data structures for accelerating relational algebra statement operations and allowing faster access to tuples of relations (e.g., large relations). In one or more embodiments of the invention, the generated imperative language code representing a translation of the RAM is specialized such that unnecessary conditions are removed and virtual dispatches that are known at compile time may be resolved.

In Step 308, the declarative language compiler generates a specialized extractor in the imperative language into which the RAM was translated in Step 306. In one or more embodiments of the invention, specialization of the extractor includes extracting only relations that would actually be used by the input declarative program when performing a program analysis. Additionally, the extractor may be specialized such that the weakest condition is applied that still covers all queries. For example, if a Datalog program uses relation A(X) and relation A occurs in conjunction with other input relations P1(X), P2(X), . . . , Pk(X) in rule bodies, then the predicate P1(X) U . . . Pk(X) is a filter that can be applied to extract a subset of relation A(X). Continuing the example, the following restrict the relation to two uses, (i.e., either the first element of A is 2 or the first element is 5):

$R(x,z):\text{-}A'(x,y), x=2, R(y,z)$ and $R(x,y):\text{-}A'(x,y), x=5$

By a traversal, the restricting predicates for an input relation are collected. The disjunction of restricting predicates of a set of input relations is used as a filtering predicate for the extractor and hence less information may be stored in the filtered relation A. Semantically, the program of the present example may be converted to:

$R(x,z):\text{-}A'(x,y), x=2, R(y,z)$ $R(x,y):\text{-}A'(x,y), x=5$ $A'(x,y):\text{-}A(x,y), x=2$ and $A'(x,y):\text{-}A(x,y), x=5$.

However, the extractor will only expose relation A'(x;y) to the program analysis engine and omit the original relation A(x;y). If relation A is large, this optimization may improve the performance since relation A'(x;y) will be smaller.

In Step 310, the declarative language compiler generates a query API in the imperative language into which the RAM was translated in Step 306. In one or more embodiments of the invention, for each output relation of the Datalog program a query API is generated. The query API may consist of an interface returning iterators for the beginning and end of the output relation. The iterators give read access to the tuples of the output relations. The query API may exist for each output relation, and the module may include the following two functions for each output relation, where <name> is the name of the relation:

Relation::iterator begin_<name>( );

Relation::iterator end_<name>( );

In Step 312, the imperative programming language code translated from the RAM, the generated specialized extractor, and the query API are compiled into an executable program analysis module. In one or more embodiments of the invention, compilation of the program analysis module includes transforming imperative programming language code into instructions (e.g., machine code) capable of being executed by one or more processors of a computing device. In one or more embodiments of the invention, once the program analysis module has been compiled, the staged compilation process ends, and the program analysis module may be ready to perform a static program analysis on an input program. For example, the program analysis module may include functionality to detect security vulnerabilities of the input program.

FIG. 4A shows a flowchart of a method for applying a portion of a modified semi-naïve algorithm to a declarative program to obtain a RAM. In one or more embodiments of the invention, the steps of FIG. 4A, or any portion thereof, may be referred to as a set of initial operations. In Step 402, a SCC graph is computed based on an input declarative program. In one or more embodiments of the invention, the SCC graph is a precedence graph that sets a topological order for evaluating the components of the SCC graph. In one or more embodiments of the invention, each component represents a portion of the declarative program, and includes one or more relations and one or more rules. A component may include non-recursive relations and/or recursive relations.

In Step 404, a determination is made as to whether the SCC graph generated in Step 402 has components remaining that have not yet been subjected to at least a portion of the semi-naïve algorithm. In one or more embodiments of the invention, if there are no more components, the process ends. In one or more embodiments of the invention, if components remain, the process proceeds to Step 406.

In Step 406, a determination is made as to whether a component is recursive. As described above, a recursive component may be any component that includes one or more recursive relations. In one or more embodiments of the invention, if the component is not recursive, the process proceeds to Step 408. In one or more embodiments of the invention, if the component is recursive, the process proceeds to Step 410.

In Step 408, one or more relations of the non-recursive component are evaluated. In one or more embodiments of the invention, evaluation of a relation includes execution of a function that evaluates rules of the relation.

Continuing with Step 428, evaluated relations are added to a computed relations set. In one or more embodiments of the invention, evaluated relations are added to a computed relations set by performing a union of the existing computed relations set (which may be empty after the initial initialization of the computed relations set) and the results of an evaluation of either a recursive or a non-recursive relation. In one or more embodiments of the invention, the process then returns to Step 404 to determine whether the SCC graph includes additional components.

Turning to Step 410, in Step 410, a determination is made as to whether a recursive component includes additional relations. In one or more embodiments of the invention, if a recursive component includes additional relations, then an iterative loop traversing the relations of the component may not yet be completed. In such a case, the portion of the semi-naïve algorithm performing the iterative loop may be referred to as an initialization loop, which performs at least a portion of a set of initial operations. If there are no additional relations in the recursive component, the process proceeds to Step 424. If there are additional relations, the process proceeds to Step 414.

In Step 414, the current knowledge of a relation is initialized. Initialization may be accomplished, for example, by setting the current knowledge to an empty set. As discussed above, after a first iteration of a loop, current knowledge may represent previous knowledge of the prior iteration, and/or delta knowledge, which was new knowledge gained in the previous iteration.

In Step 416, a determination is made as to whether the relation includes additional non-recursive rules. In one or more embodiments of the invention, if a relation includes additional rules (i.e., clauses), then an iterative loop traversing the rules of the relation may not yet be completed. In one or more embodiments of the invention, if the relations do include additional non-recursive rules, then the process proceeds to Step 418. In one or more embodiments of the invention, if the relation does not include additional rules, the process proceeds to Step 420.

In Step 418, the current knowledge of the relation is updated for the non-recursive rules by evaluating the non-recursive rule, and the process returns to Step 416 to determine if the relation includes additional rules.

Turning to Step 420, in Step 420, a new knowledge (dRi) is set to current knowledge (Ri). Setting new knowledge to current knowledge may include adding to or replacing the current knowledge being tracked by the semi-naïve algorithm to the new knowledge gained in the previous iteration of the initialization loop.

In Step 422, previous knowledge for a relation is set to empty set and the process returns to Step 410 to determine if the component includes additional relations. Turning to Step 424, in Step 424, in one or more embodiments of the invention, delta knowledge is renamed as X knowledge (XRi), and the process proceeds to Step 426 and, therefore, to FIG. 4B.

FIG. 4B shows a flowchart of a method for applying a portion of a modified semi-naïve algorithm to a declarative program to obtain a RAM. Specifically, FIG. 4B shows the modified fixed-point portion of a modified semi-naïve algorithm.

In Step 450, a determination is made as to whether there are additional relations for a first unrolled loop of the modified fixed point portion of the semi-naïve algorithm. In one or more embodiments of the invention, if there are no additional relations, the process proceeds to Step 460. In one or more embodiments of the invention, of there are additional relations the process proceeds to Step 452.

In Step 452, a Y knowledge (YRi) is initialized for an iteration of the first unrolled loop. In one or more embodiments of the invention, the YRi is initialized by setting the YRi to empty set.

In Step 454, a determination is made as to whether there are any additional rules in the relation of the present iteration of the first unrolled loop. In one or more embodiments of the invention, if there are no more rules, the process returns to Step 450 to determine if there are any more relations. In one or more embodiments of the invention, if there are more rules, the process proceeds to Step 456.

In Step 456, the relation of the present iteration of the first unrolled loop is evaluated. In one or more embodiments of the invention, evaluation of the relation in the first unrolled loop includes execution of a function which evaluates the clauses of the relation using, at least in part, XRi.

In Step 458, YRi is updated, based on the evaluation of the relation, with new knowledge, if any, gained during the evaluation of the relation. The process then returns to Step 454 to determine if the relation includes additional rules, and, if so, perform another iteration of the first unrolled loop.

Turning to Step 460, in Step 460, a determination is made as to whether YRi includes any new knowledge gained during execution any iterations of the first unrolled loop. In one or more embodiments of the invention, if there is no new knowledge in the Y knowledge, the process proceeds to Step 478. In one or more embodiments of the invention, if YRi does include new knowledge, the process proceeds to Step 462. In Step 462, current knowledge is set to the union of current knowledge and the Y knowledge gained via execution of the first unrolled loop, which may be referred to as updated current knowledge.

In Step 464, the process enters a second unrolled loop and a determination is made whether the component includes additional relations. In one or more embodiments of the invention, if there are no additional relations, the process proceeds to Step 474. In one or more embodiments of the invention, if there are additional relations, the process proceeds to Step 466.

In Step 466, XRi is initialized for an iteration of the second unrolled loop. In one or more embodiments of the invention, the X knowledge is initialized by setting the X knowledge to empty set. In Step 468, a determination is made as to whether there are more rules in the present relation of the second unrolled loop. In one or more embodiments of the invention, if there are no more rules, the process returns to Step 464 to determine if there are additional relations to evaluate in the second unrolled loop. In one or more embodiments of the invention, if there are more rules, the process proceeds to Step 470.

In Step 470, the relation of the present iteration of the second unrolled loop is evaluated. In one or more embodiments of the invention, evaluation of the relation in the second unrolled loop includes execution of a function which evaluates the clauses of the relation using, at least in part, YRi, which was added to the updated current knowledge Step 458.

In Step 472, XRi is updated, based on the evaluation of the relation in the second unrolled loop, with new knowledge, if any, gained during the evaluation. The process then returns to Step 468 to determine if the relation includes additional rules, and, if so, another iteration of the second unrolled loop is performed.

Turning to Step 474, in Step 474, a determination is made as to whether XRi includes any new knowledge gained during execution of the second unrolled loop. In one or more embodiments of the invention, if there is no new knowledge in XRi, the process proceeds to Step 478. In one or more embodiments of the invention, of XRi does include new knowledge, the process proceeds to Step 476.

In Step 476, current knowledge is set to the union of current knowledge and XRi gained via execution of the second unrolled loop. In one or more embodiments of the invention, the product of the union is used during additional executions of the first unrolled loop.

In Step 478, a determination has previously been made that in at least one of the two unrolled loops, no new knowledge was discovered, and thus the process returns to FIG. 4A, where the relations evaluated in the two unrolled loops of FIG. 4B are added to the computed relations set and the process returns to Step 404 of FIG. 4A to determine if the SCC graph includes additional components.

The following in an example for explanatory purposes only and is not intended to limit the scope of the invention.

Consider a scenario in which the following example Datalog program computes the transitive closure of the binary relation edge(u,v) and stores the result in the relation path(u,v):

edge(1,2).

edge(2,3).

path($u,v$):–edge($u,v$).

path($u,w$):–edge($u,v$), path($v,w$).

The above Datalog program may be provided as input to a declarative language compiler to be subjected to the above described staged compilation process in order to generate an executable program analysis module. The Datalog program is parsed and semantically checked, and then an SCC graph is generated.

The SCC graph of the example above contains two components. A non-recursive component that contains the relation edge and a recursive component path. The topological order will enforce the evaluation of relation edge before relation path. In the first step, the tuples of the facts are loaded in the relation. In the second step the path relation is computed recursively. The modified semi-naïve algorithm translates the above Datalog program a RAM, which may be seen in FIG. 5.

Figure 5:
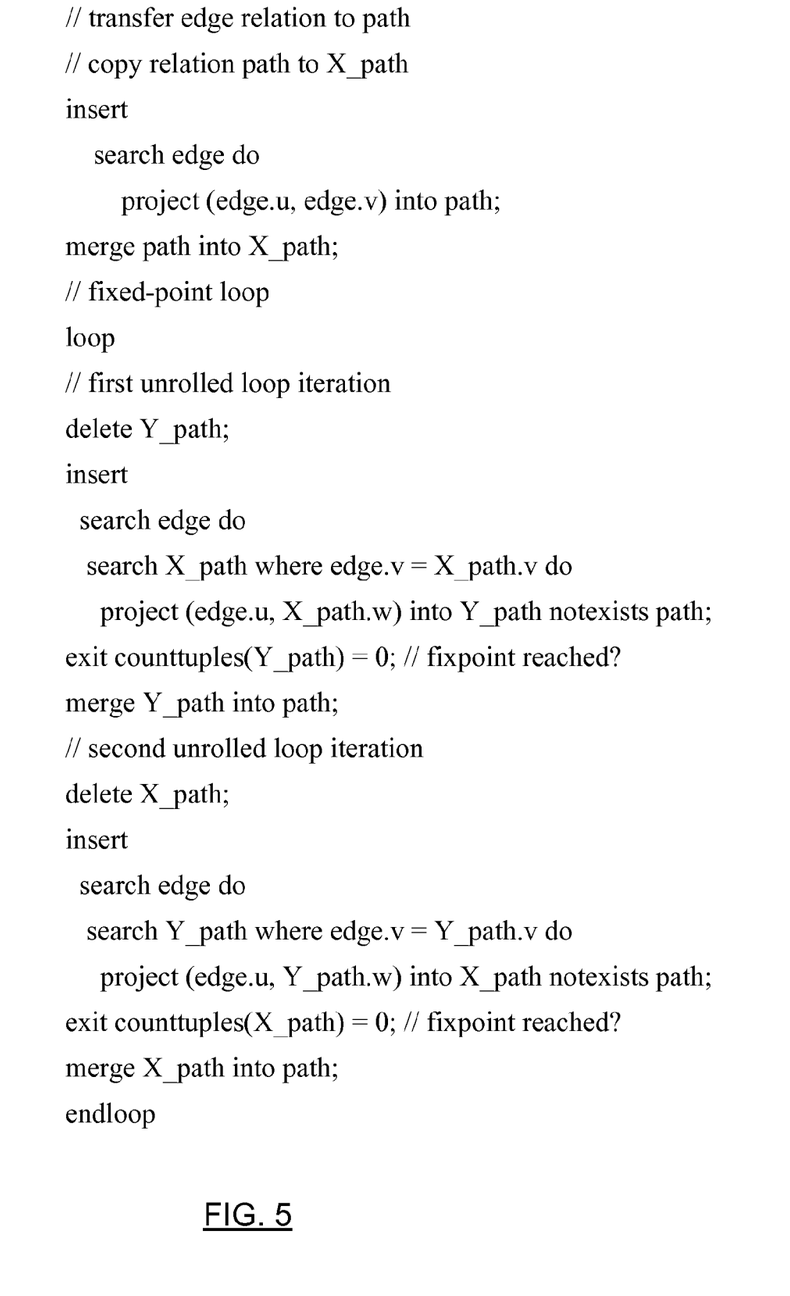
FIG. 5 shows an example relational algebra machine in accordance with one or more embodiments of the invention.

In the example RAM of FIG. 5, there is an initialization phase which transfers the edge relation into the path relation. Then, the result of the non-recursive rule is copied to the delta knowledge, which is stored in relation X_path for the first unrolled loop. Then, the fixed point loop is entered and executed ad infinitum. The loop terminates as soon as no new knowledge can be found in either the first unrolled loop iteration or in the second unrolled loop iteration. Note that the roles of X_path and Y_path change from delta knowledge to new knowledge, respectively depending on the unrolled loop iteration.

Once the Datalog program has been translated into a RAM, the RAM may be translated by the declarative language compiler into imperative language code. Next, the declarative programming language compiler generates a specialized extractor and a query API, each in the same imperative programming language into which the Datalog program was translated. Finally, the translated RAM, the specialized extractor, and the query API are compiled into an executable program analysis module for performing static program analysis of input programs.

Figure 6:
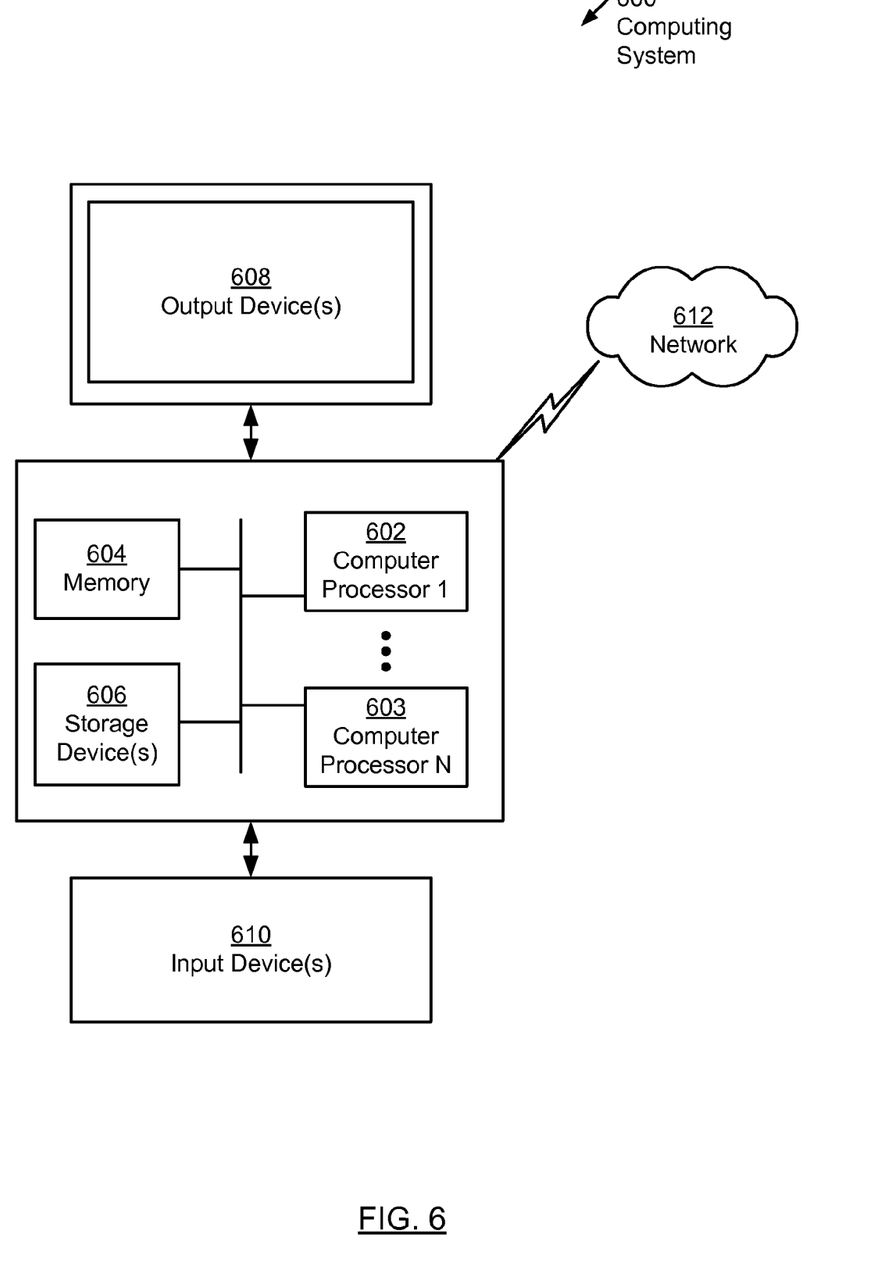
FIG. 6 shows a computing system in accordance with one or more embodiments of the invention.

Embodiments of the invention may be implemented on a computing system. Any combination of mobile, desktop, server, embedded, or other types of hardware may be used. For example, as shown in FIG. 8, the computing system (600) may include two or more computer processor(s) (602, 603), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602, 603) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, camera, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602, 603), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the invention.

Further, one or more elements of the aforementioned computing system (600) may be located at a remote location and connected to the other elements over a network (612). Further, embodiments of the invention may be implemented on a distributed system having a plurality of nodes, where portions of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for staged compilation of a declarative program comprising:
    receiving the declarative program;
    parsing and semantically checking the declarative program;
    translating the declarative program into a relational algebra machine (RAM) using a modified semi-naïve algorithm, wherein the modified semi-naïve algorithm is a semi-naïve algorithm with modifications comprising unrolling two iterations of a fixed-point loop;
    performing a translation of the RAM into code of an imperative programming language to obtain a translated RAM;
    generating specialized extractor code in the imperative programming language,
    wherein the specialized extractor code comprises a reduced set of relations extracted from the declarative program;
    generating query application programming interface (API) code in the imperative programming language;
    compiling the translated RAM, the specialized extractor code, and the query API code to obtain a program analysis module;
receiving a program for analysis;
providing the program as input to the program analysis module;
extracting a plurality of input relations from the program; and
performing, using the plurality of input relations, a static program analysis on the program.

2. The method of claim 1, wherein, after compilation, the program analysis module comprises a program analysis engine, a specialized extractor, and a query API.

3. The method of claim 2, further comprising:
receiving, via the query API, a static program analysis query; and
    returning, in response to the static program analysis query, a static program analysis result comprising a security vulnerability of the program.

4. The method of claim 1, wherein translating the declarative program into the RAM using the modified semi-naïve algorithm comprises:
    performing a set of initial operations;
    executing, after performing the set of initial operations, a plurality of first unrolled loop iterations;
    making a first determination, after executing the plurality of first unrolled loop iterations, that first new knowledge was found during execution of the plurality of first unrolled loop iterations;
    adding the first new knowledge to current knowledge to obtain first updated current knowledge;
    executing, after executing the plurality of first unrolled loop iterations, a plurality of second unrolled loop iterations;
    making a second determination, after executing the plurality of second unrolled loop iterations, that second new knowledge was found during execution of the plurality of second unrolled loop iterations;
    adding the second new knowledge to the first updated current knowledge to obtain second updated current knowledge;
    re-executing the plurality of first unrolled loop iterations and the plurality of second unrolled loop iterations until a third determination is made that no new knowledge is found after execution of one selected from a group consisting of the plurality first unrolled loop iterations and the plurality of second unrolled loop iterations; and
    adding, based on the third determination, relations of a component to a computed relations set.

5. The method of claim 4, wherein each first unrolled loop iteration of the plurality of first unrolled loop iterations comprises:
    initializing a Y knowledge by setting the Y knowledge to a Y knowledge empty set,
    selecting a rule of a plurality of rules of the relation of the component;
    performing a first evaluation of the relation using a relation current knowledge and the X knowledge to obtain a first evaluation result; and
    updating the Y knowledge using the first evaluation result; and
    wherein each second unrolled loop iteration of the plurality of second unrolled loop iterations comprises:
    initializing the X knowledge by setting the X knowledge to an X knowledge empty set;
    selecting the rule of the relation of the component;
    performing a second evaluation of the relation using the first updated current knowledge to obtain a second evaluation result; and
    updating relation X knowledge using the second evaluation result.

6. The method of claim 1, wherein the use of the modified semi-naïve algorithm enables parallelization of a plurality of operations.

7. The method of claim 1, wherein the declarative program is expressed in Datalog.

8. A system for staged compilation of a declarative program comprising:
a declarative language compiler configured to receive a declarative program as input, and comprising:
    a parse and semantic check module configured to parse and semantically check the declarative program;
    a graph generation module configured to compute a strongly connected component graph;
    a relational algebra machine (RAM) generation module configured to translate the declarative program into a relational algebra machine (RAM) using a modified semi-naïve algorithm, wherein the modified semi-naïve algorithm is a semi-naïve algorithm with modifications comprising unrolling two iterations of a fixed-point loop; and
a code generation module configured to:
perform a translation of the RAM into code of an imperative programming language to obtain a translated RAM;
    generate specialized extractor code in the imperative programming language, wherein the specialized extractor code comprises a reduced set of relations extracted from the declarative program;
    generate query API code in the imperative programming language;
    compile the translated RAM, the specialized extractor code, and the query API code to obtain a program analysis module;
    receive a program for analysis;
    provide the program as input to the program analysis module;
    extract a plurality of input relations from the program; and
    perform, using the plurality of input relations, a static program analysis on the program.

9. The system of claim 8, wherein, after compilation, the program analysis module comprises a program analysis engine, a specialized extractor, and a query API.

10. The system of claim 9, wherein after compilation of the program analysis module, the program analysis module is configured to:
receive, via the query API, a static program analysis query;
return, in response to the static program analysis query, a static program analysis result comprising
a security vulnerability of the program.

11. The system of claim 8, wherein use of the modified semi-naïve algorithm causes the RAM generation module to be configured to:
perform a set of initial operations;
execute, after performing the set of initial operations, a plurality of first unrolled loop iterations;
make a first determination, after executing the plurality of first unrolled loop iterations, that first new knowledge was found during execution of the plurality of first unrolled loop iterations;
add the first new knowledge to current knowledge to obtain first updated current knowledge;
execute, after executing the plurality of first unrolled loop iterations, a plurality of second unrolled loop iterations;
make a second determination, after executing the plurality of second unrolled loop iterations, that second new knowledge was found during execution of the plurality of second unrolled loop iterations;
add the second new knowledge to the first updated current knowledge to obtain second updated current knowledge;
re-execute the plurality of first unrolled loop iterations and the plurality of second unrolled loop iterations until a third determination is made that no new knowledge is found after execution of one selected from a group consisting of the plurality first unrolled loop iterations and the plurality of second unrolled loop iterations; and
add, based on the third determination, relations of a component to a computed relations set.

12. A non-transitory computer readable medium comprising instructions that, when executed by a computer processor, perform a method for staged compilation of a declarative program comprising:
receiving the declarative program;
parsing and semantically checking the declarative program;
translating the declarative program into a relational algebra machine (RAM) using a modified semi-naïve algorithm, wherein the modified semi-naïve algorithm is a semi-naïve algorithm with modifications comprising unrolling two iterations of a fixed-point loop;
performing a translation of the RAM into code of an imperative programming language to obtain a translated RAM;
generating specialized extractor code in the imperative programming language, wherein the specialized extractor code comprises a reduced set of relations extracted from the declarative program;
generating query API code in the imperative programming language;
compiling the translated RAM, the specialized extractor code, and the query API code to obtain a program analysis module;
receiving a program for analysis;
providing the program as input to the program analysis module;
extracting a plurality of input relations from the program; and
performing, using the plurality of input relations, a static program analysis on the program.

13. The non-transitory computer readable medium of claim 12, wherein, after compilation of the program analysis module, the program analysis module comprises a program analysis engine, a specialized extractor, and a query API.

14. The non-transitory computer readable medium of claim 13, wherein the method further comprises:
receiving, via the query API, a static program analysis query; and
returning, in response to the static program analysis query, a static program analysis result
comprising a security vulnerability of the program.

15. The non-transitory computer readable medium of claim 12, wherein translating the declarative program into the RAM using the modified semi-naïve algorithm comprises:
performing a set of initial operations;
executing, after performing the set of initial operations, a plurality of first unrolled loop iterations;
making a first determination, after executing the plurality of first unrolled loop iterations, that first new knowledge was found during execution of the plurality of first unrolled loop iterations;
adding the first new knowledge to current knowledge to obtain first updated current knowledge;
executing, after executing the plurality of first unrolled loop iterations, a plurality of second unrolled loop iterations;
making a second determination, after executing the plurality of second unrolled loop iterations, that second new knowledge was found during execution of the plurality of second unrolled loop iterations;
adding the second new knowledge to the first updated current knowledge to obtain second updated current knowledge;
re-executing the plurality of first unrolled loop iterations and the plurality of second unrolled loop iterations until a third determination is made that no new knowledge is found after execution of one selected from a group consisting of the plurality first unrolled loop iterations and the plurality of second unrolled loop iterations; and
adding, based on the third determination, relations of a component to a computed relations set.

16. The non-transitory computer readable medium of claim 15, wherein each first unrolled loop iteration of the plurality of first unrolled loop iterations comprises:
initializing a Y knowledge by setting the Y knowledge to a Y knowledge empty set,
selecting a rule of a plurality of rules of the relation of the component;
performing a first evaluation of the relation using a relation current knowledge and the X knowledge to obtain a first evaluation result; and
updating the Y knowledge using the first evaluation result; and
wherein each second unrolled loop iteration of the plurality of second unrolled loop iterations comprises:
initializing the X knowledge by setting the X knowledge to an X knowledge empty set;
selecting the rule of the relation of the component;
performing a second evaluation of the relation using the first updated current knowledge to obtain a second evaluation result; and
updating relation X knowledge using the second evaluation result.

17. The non-transitory computer readable medium of claim 12, wherein the use of the modified semi-naïve algorithm enables parallelization of a plurality of operations.

18. The non-transitory computer readable medium of claim 12, wherein the declarative program is expressed in Datalog.

\* \* \* \* \*

UNITED STATES PATENT AND TRADEMARK OFFICE
CERTIFICATE OF CORRECTION

PATENT NO. : 9,875,087 B2  
APPLICATION NO. : 14/714208  
DATED : January 23, 2018  
INVENTOR(S) : Scholz et al.

Page 1 of 1

It is certified that error appears in the above-identified patent and that said Letters Patent is hereby corrected as shown below:

On the Title Page

Page 2, Column 2, under Other Publications, Line 2, delete "[Retrived" and insert -- [Retrieved --, therefor.

In the Specification

In Column 3, Line 13, after "kit)" insert -- . --.

In Column 10, Line 5, delete "A'(x;y)" and insert -- A'(x,y) --, therefor.

In Column 10, Line 7, delete "A(x;y)." and insert -- A(x,y). --, therefor.

In Column 10, Line 8, delete "A'(x;y)" and insert -- A'(x,y) --, therefor.

Signed and Sealed this  
Twenty-first Day of August, 2018

Andrei Iancu  
*Director of the United States Patent and Trademark Office*